Sept. 13, 1938.  A. CHRISTIANSON ET AL  2,129,910
CAR TRUCK
Filed Dec. 17, 1936   3 Sheets-Sheet 2
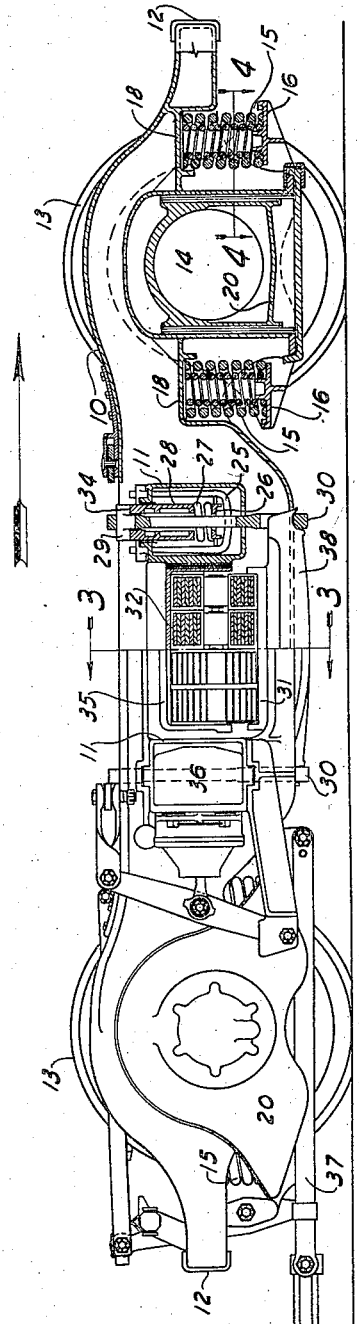
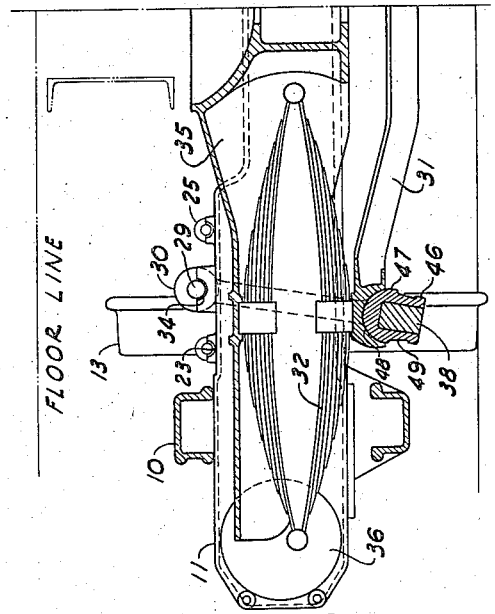
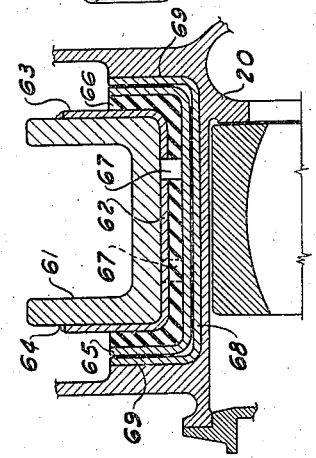
INVENTORS
ANDREW CHRISTIANSON
OTTO JABELMANN
BY Oscar Hochberg
THEIR ATTORNEY Sept. 13, 1938.  A. CHRISTIANSON ET AL  2,129,910
CAR TRUCK
Filed Dec. 17, 1936   3 Sheets-Sheet 3
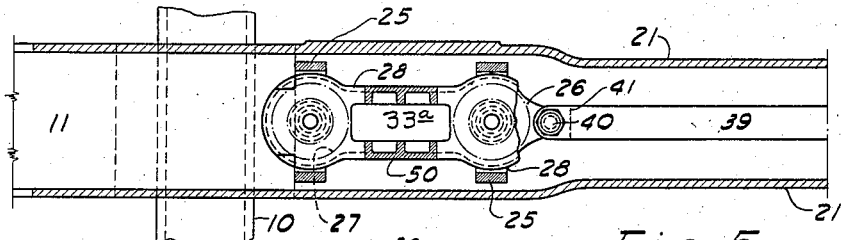
FIG. 5
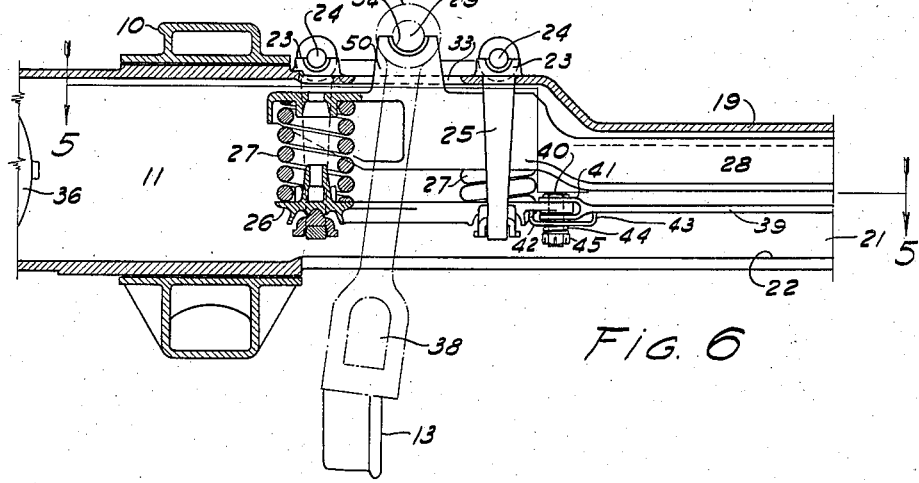
FIG. 6
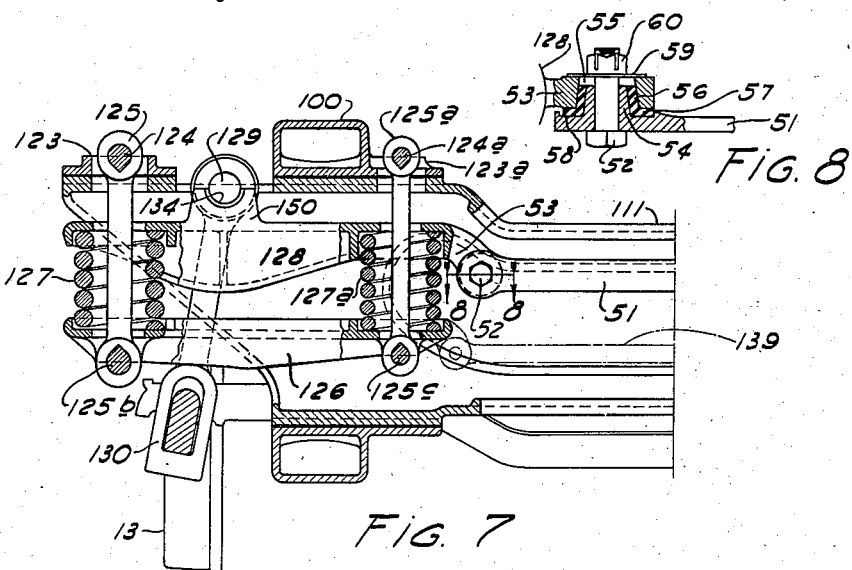
FIG. 8
FIG. 7
INVENTORS
ANDREW CHRISTIANSON
OTTO JABELMANN
BY Oscar Hochberg
THEIR ATTORNEY Patented Sept. 13, 1938

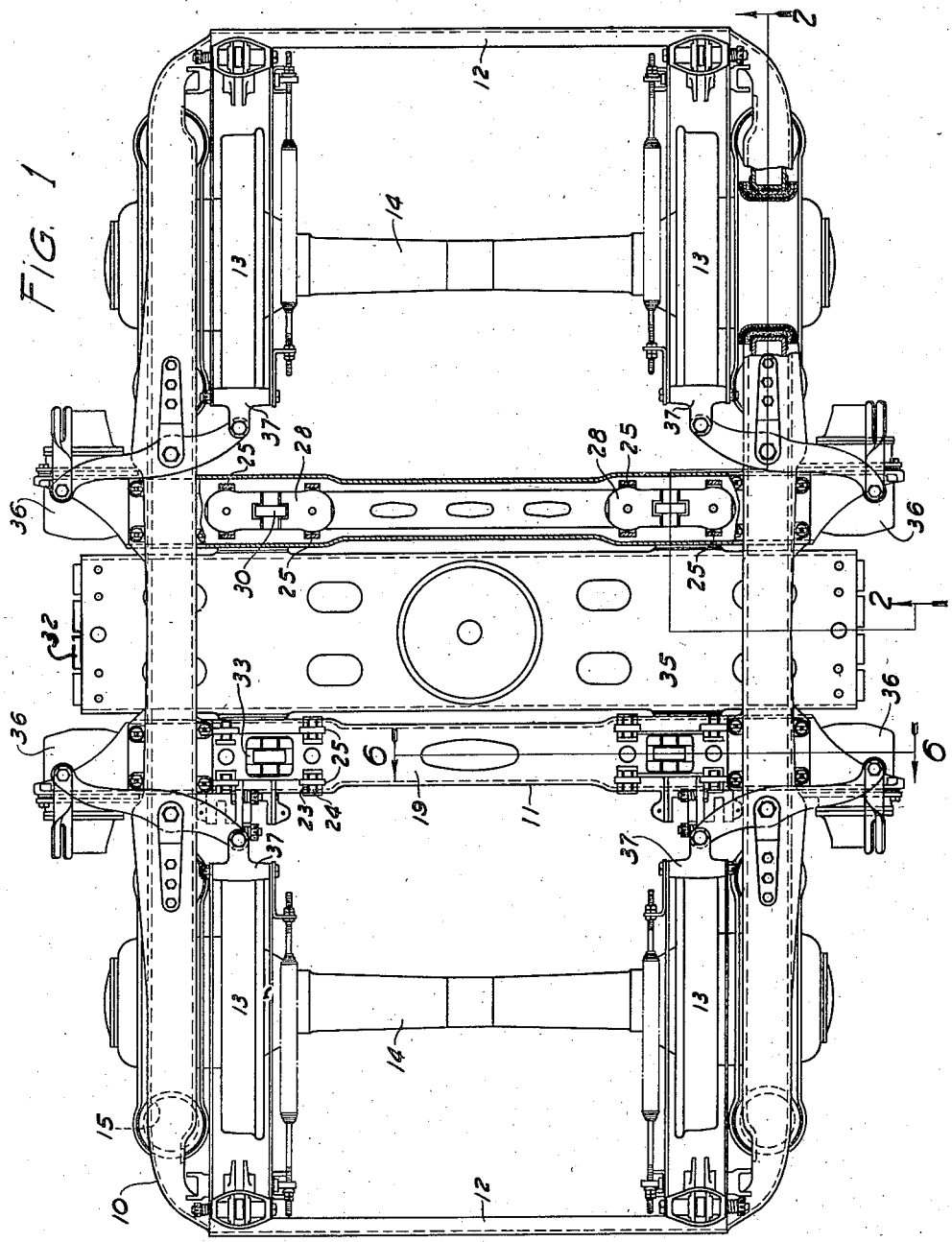

2,129,910

UNITED STATES PATENT OFFICE 2,129,910

CAR TRUCK

Andrew Christianson, Hammond, Ind., and Otto Jabelmann, Omaha, Nebr.

Application December 17, 1936, Serial No. 116,260

14 Claims. (Cl. 105—190)

The invention relates to car trucks generally and has particular reference to the truck frame and bolster suspension mechanism.

The principal object of the invention is to provide triple spring suspension means designed to eliminate synchronization of the springs and thereby to insure stability of operation of the truck and prevent transmission of vibration resulting from rail and wheel impacts.

An important object is to provide triple suspension means involving springs having frequencies of different values so that vibrations set up by abrupt changes in the direction and magnitude of the loads applied at the several springs will not be synchronized.

A particular object is to provide cushioning and stabilizing means for the bolster swing hangers intermediate the bolster elliptic springs and the springs at the journal boxes, the intermediate cushioning means being supported by auxiliary swing hangers suspended vertically from the truck frame.

The foregoing and other objects are attained by the mechanism illustrated in the accompanying drawings, in which—

Fig. 1 is a general plan of a car truck embodying the invention;

Fig. 2 is a view of the truck in side elevation with a portion thereof in cross-section taken on line 2—2 of Fig. 1;

Fig. 3 is a vertical section taken transversely of the truck on line 3—3 of Fig. 2, through bolster and spring plank;

Fig. 4 is a horizontal section through truck frame pedestal and adjacent portion of journal box taken on line 4—4 of Fig. 2;

Fig. 5 is a similar view through the transoms of the truck frame taken on line 5—5 of Fig. 6, showing intermediate cushioning support;

Fig. 6 is a vertical section taken transversely of the truck on line 6—6 of Fig. 1, through one of the truck frame transoms showing the intermediate cushioning assembly;

Fig. 7 is a similar view showing the intermediate cushioning assembly modified for use with trucks having inboard frame members; and Fig. 8 is an enlarged fragmentary horizontal sectional view through the joint between the spring caps and connecting bar taken on line 8—8 of Fig. 7.

The invention is carried out by mounting the truck frame wheel pieces 10 upon coil springs 15 of a given deflection value supported upon the journal boxes 20 so that the load reactions thence would flow to auxiliary swing hangers 25, suspended vertically and in parallel from the truck frame transoms 11, to spring seats 26 through intermediate springs 27 of relatively high frequency value, thence to separate and independent continuous cap beams 28 bearing pivots 29 at each transom 11 for supporting separate bolster swing hangers 30, to spring plank 31 through elliptic springs 32 having a relatively low frequency value, thence to the bolster 35. By the provision of springs of different frequencies, the vibrations set up at the wheel are offset by those at the other positions and caused to be overlapped, thereby to prevent the building-up of the combined recoil values of the several springs. By the use of relatively high frequency springs intermediate those at the journal box and the bolster elliptic springs, the bolster swing hanger supporting pivots 29 remain substantially quiescent and undisturbed by the relatively greater movements of the bolster and truck frame with respect to the rail whereby the reactions to truck movement over high spots and depressions in the track will not be communicated to the car body.

As outlined in the drawings, the invention may be adapted to either outboard or inboard types of truck frame. Figs. 1 through 6 depict the outboard framing members 10 between which are the connecting transom members 11 and end sills 12 with pairs of wheels 13 on axles 14 positioned between said transoms and respective end sills as in customary practice. In the embodiment shown, the main supporting springs 15 are supported upon seats 16 on journal boxes 20 in planes substantially below the center line of the axles 14 to minimize the tendency of the springs to upset under braking or starting thrusts or laterally when rounding curves.

The frames are formed with spring caps 10 designed to receive and hold in place the springs 15 upon opposite sides of the journal boxes 20, although the supporting springs 15 may be mounted on top of the boxes should that arrangement be desired or when the space beneath the car floor will permit, but the relatively stable disposition of the springs on seats below the axle center, as shown, is preferred.

The connecting transoms 11 are preferably hollow and rigid with the wheel pieces 10 and formed each with top web 19 and side wall members 21 reinforced by flanges 22 along their lower edges spaced apart to admit the auxiliary suspension elements comprising the vertical hanger links 25, the springs 27, the continuous spring connecting beam 28, the spring seats 26, and inclined bolster swing hanger arm 30, as best shown in Figs. 1, 2, 5 and 6. The transoms are provided on their upper sides with bearings 23 for the pivots 24 of hangers 25 and openings 33 to receive bearings 34 on the spring cap connecting beams 28 for the bolster swing hanger pivots 29. The transoms are extended outwardly beyond the wheel pieces 10 to provide supports for separate brake cylinders 36 actuating the independent brake riggings 37 for each wheel.

Under thrust of loads tending to shift the bolster 35 from the normal position indicated in the half-section view in Fig. 3, a movement to the left will cause the inclined bolster swing hanger 30 on the side shown to assume a greater angularity with respect to the spring plank 31 to shorten the hanger arm and compress adjacent bolster spring 32 under the increased load imposed, whereby the springs on the opposite side of the truck will be relieved of a part of their load by the lengthening of the bolster hanger arm on that side and resultant lowering of the adjacent end of the spring plank. The force of the thrust applied at the bolster hanger pivot 29 is communicated to its bearing 34 on continuous spring cap beam 28 and transmitted through springs 27 to seat 26 suspended from the truck frame by the parallel hangers 25 arranged normally vertical for purposes hereinafter outlined.

As the hangers 25 move from their normal vertical position under the load imposed by the bolster hanger pivot 29, the springs 27 are compressed as the angularity of the hanger arms 25 increases to oppose movement of such pivot outwardly towards adjacent side frame by a thrust in the opposite direction under the pent-up energy of the compressed auxiliary springs. The force of the thrust upon pivot 29 subsides at a rate corresponding to the increase in the pressure on the springs 27 until the limit of movement has been reached for the pivot, whereupon the stored energy in the springs is released to restore said pivot and hangers 25 to their normal positions of rest. Neutralization of forces and restoration of pivot position are effected without shock by virtue of the initial vertical disposition of all the hangers 25 whereby normal swinging movements are absorbed without appreciably communicating vibrations to the bolster hanger pivots 29 and result from the greater initial arc of movement of the vertically disposed auxiliary hangers at the spring seats 26 than is possible with hangers normally inclined with respect to the seats.

Because of the initially vertical disposition of the hangers 25, the abrupt lift of auxiliary spring seats 26 on one side of the truck and compensating drop of companion seats on opposite side are avoided, whereby the spring cap connecting beam 28 supporting the bolster assembly is held in position to become immediately effective yieldably to restrain lateral displacement of bolster hanger pivots 29 and independently of the direction of bolster movement laterally of the truck. With the auxiliary hangers 25 at one end of the continuous spring beam 28 disposed in parallelism with similar hangers at the opposite end, the spring seats 26 will both of them move in planes parallel to a horizontal plane through pivots 24 of these hangers to maintain, through auxiliary springs 27, the spring connecting beam 28 substantially stable, and through said beam the pivots 29 of bolster swing hangers on opposite sides of the truck are held fixed with respect to each other to permit the described movement of the bolster when suspended by hangers 30 inclined as indicated.

The spring cap connecting beams 28 are illustrated in Figs. 1 and 6 as rigid members extending from the auxiliary springs 27 on one side of the truck to the auxiliary springs 27 on the opposite side of the truck within the respective transoms 11 upon opposite sides of the bolster 35. The spring caps, thus connected, function to prevent nosing of the caps outwardly under the influence of the weight of the bolster assembly carried by the inclined bolster swing hangers 30 which, because of such inclination, tend to shift the pivots 29, with their bearings 34, towards a plane passing through the point of application of the load at the respective swing hanger crossbars 38 held apart by the spring plank 31. If desired, the spring caps may be connected by a separate member somewhat after the fashion indicated in Fig. 7 hereinafter to be described.

It will be noted that the spring cap beam members 28 on one side of the bolster 35 are mounted separately and independently of the spring cap beam members 28 on the opposite side of the bolster, and the movements of one member are not communicated to the other since there is no direct connection between them. The bolster swing hangers 30, supported from the cap beam members 28, move with their respective members and in response to the loads imposed on such members. The hangers 30 are connected by separate crossbars 38 bridging the space between them to serve at once as supports for the spring plank 31 holding inclined the bolster swing hangers and as equalizers for breaking up the longitudinal rocking of the truck frame to prevent transmission of such movement to the spring plank whereby the bolster is held from tilting about its axis during train movement.

As the result of the use of said crossbars 38 as equalizers, a high spot in the rail striking the forward wheel of the truck moving in the direction indicated by the arrow in Fig. 2, would cause that end of the truck to rise an amount determined by the force of impact. Such movement would cause a proportional rise in the adjacent transom supporting the auxiliary suspension springs 27, but, owing to the inertia of the bolster, the springs 27 will yield to permit the bolster swing hanger pivots 29 at that side of the bolster to drop relatively to said transom to compensate for the rise of the truck frame 10 whereby the crossbars 38 will be leveled-out to preserve the bolster equilibrium. Obviously, a movement of the truck in the opposite direction would give rise to a similar sequence of operations in the members on the opposite side of the bolster to effect the same result.

As best shown in Figs. 5 and 6, the auxiliary spring seats 26 may also be connected, for simultaneous operation, to the seats on the opposite side of the truck by bar members 39 pivotally secured by headed bolts 40. The bars 39 are formed preferably as shown with jaws 41 to receive between them the inner end of the spring seat 26 and the bolt 40 inserted to connect them. To prevent chattering of the parts, a metal clip 42, perforated to receive the bolt 40 and bent at its ends to provide contact portions 43, is mounted on the shank of the bolt in position to effect contact between one of the clip ends 43 and the spring seat 26 and between the bar 39 and the opposite end 43 of the clip with the body of the clip spaced from the jaw 41 so that the pressure of spring 44 held by nut 45 against the plate will urge the ends of the clip against the connected members in opposition to the pull of the bolt head under tension of the spring 44, whereby the joint will provide sufficient flexibility of movement between the connected parts to permit possible angularities with respect to each other during the swinging movements of the seats.

The invention may be adapted to truck frames of the inboard type indicated in Fig. 7 at 100 wherein the transoms 111 extend beyond the wheel pieces to provide support for the bolster swing hangers 130. In this embodiment, the auxiliary spring suspension is modified to the extent of disposing the intermediate outer and inner hanger links 125 and 125a upon opposite sides of the wheel pieces and the bolster swing hangers 130 between the frame and outer auxiliary suspension hanger 125.

The outer hangers are suspended from pivots 124 on bearings 123 on the transoms 111 and the inner hangers 125a suspended from pivots 124a on bearings 123a carried by the wheel pieces. Both hangers 125 and 125a are connected at their lower ends by spring seats 126 to which the hangers are secured by pivots 125b and 125c respectively. An outer spring 127 and a relatively light inner spring 127a are mounted upon said seats, and spring cap beams 128 supported upon the springs for mounting the bolster swing hangers 130 by pivots 129 journaled in bearings 134 on supporting pedestal 150.

The spring caps 128 of the modified embodiment are connected together as in the rigid form previously described and shown in Fig. 6, except that a separate connecting bar 51 is joined at its end to separate adjacent caps 128 and connection effected by headed bolts 52 passing through embossments 54 on the bar and openings 55 in brackets 53 on the caps 128. The bar and spring beams are insulated by rubber gaskets 56 surrounding the embossments 54 and preferably formed with base flanges 57 entered in recessed seats 58 on the bar 51 to prevent metal-to-metal contact between the parts. The embossments 54 and openings 55 are preferably tapered as shown in Fig. 8 to permit the proper nesting of the gaskets 56 within the openings and provide a compensating take-up for wear. The bracket openings 55 are covered on the contracted side by washers 59 against which are seated the nuts 60 fitted to the bolts 52 so that when the bolts are secured in position the gasket 56 will operate to cushion the pull of the bar 51 on the spring beams 128 tending further to prevent transmission of vibration to the hangers 130.

In the modified form, the outer and inner hangers 125 and 125a are of the single link type and extend axially through their respective springs 127 and 127a, the outer springs and hangers being heavier and of greater capacity than their companion inner members since the bolster swing hangers 130 are mounted upon the cap beams 128 relatively close to the outer auxiliary hangers 125 thereby to impose approximately two-thirds of their respective loads upon said hangers, whereby the remainder of the load is carried by the relatively light inner hangers and springs 125a and 127a, respectively, farther removed from the bolster hangers 130. Since the springs 127 and 127a are of different frequency value, the vibrations thereof overlap and are thus dampened to prevent synchronization and thereby further to prevent the transmission of galloping movements to the bolster hangers 130.

Further to reduce vibration in the bolster hangers, the bearing pedestals 50 on spring cap beams 28 shown in Figs. 5 and 6 may be lowered until the centers of bolster hanger pivots 29 are positioned in a plane lower than the axes of auxiliary hanger pivots 24 in the manner indicated in Fig. 7 in which the bolster hanger pivots 129 on pedestals 150 are in a plane below auxiliary hanger pivots 124 and 124a thereby to lend greater stability to the assembly as a whole and resulting in the shortening of the hangers 130 to insure ample clearance between them and the truck frame 10 at the spring plank position. As best shown in Fig. 3, the equalizers 38 between the bolster hangers 30 upon opposite sides of the bolster 35 may be fitted with wearing pieces 46 having relatively large arcuate bearing surfaces 47 nested within respectively adjacent, complemental, recessed bearings 48 on the spring plank 31, the pieces being formed with side leg portions 49 closely to embrace the underlying equalizers 38, whereby the additional friction thus obtained will operate further to dampen the movements of the bolster swing hangers to the end that the bolster hanger pivots shall be relieved of all possible strains and vibration to prevent transmission thereof to the car body.

Further to prevent the transmission of vibrations from the wheels to the truck frame 10, cushioning means is introduced between the pedestals 61 of the truck frame and journal boxes 20. The cushioning assembly comprises a securing plate 62, channel-shaped with its flanges 63 welded at 64 to the pedestals, an outer wear plate 65 also channel-shaped with its web and flanges spaced from the inner plate 62, and a rubber bushing 66 between and bonded to said plates. To provide for the flow of the bushing rubber under pressure in the web areas of the plates 62 and 65, the bushing is formed with openings 67 at spaced intervals throughout its length and width as best shown in Fig. 4. The plates and bushing are preferably assembled on the bench and secured as a unit to the pedestals 61, as indicated in Figs. 1, 2 and 4.

The journal boxes 20 of the present embodiment are indicated as formed with recesses to receive the pedestals 61 and respective cushioning assemblies. The recesses are channel-shaped and fitted with wearing plate liners having each a web 68 and side flanges 69 designed frictionally to engage respectively continguous parts of the cushioning assemblies on the pedestals, whereby impact loads resulting from braking operations and other causes will be substantially reduced. As shown, the pedestals 61 of the frame slidably engage adjacent sides of the respective journal boxes through the medium of the cushion face plates 65 bonded to the bushing 66.

In both embodiments of the invention, the auxiliary spring beam hangers designated variously as 25, 125 and 125a, are each pair of them on one side of the truck parallel to companion pairs of hangers on the opposite side of the truck, so that in operation, when the auxiliary spring seats supported by hangers hung vertically at respectively opposite sides of the truck are shifted transversely by thrust of a load applied at either seat, the seats will be lifted simultaneously and in a common horizontal plane to prevent canting of the respective spring groups, the pressures to be absorbed by the several springs of each group will be more equably distributed, and forces tending to upset the springs are minimized or eliminated.

It will be noted that the bolster hangers 30 and 130 are movable between respective pedestals 50 and 150 of the spring beams from which they are pivotally hung for movement under thrust transversely of the truck, and that the hanger-supporting pivots 29 and 129 may be higher or lower with respect to auxiliary hanger pivots 25, 125 and 125a as hereinbefore stated. The range of movement of the bolster hangers at the openings 33a in the spring beams 28 will vary with different heights of such pivot points and the length of the openings 33a designed to permit the maximum swing of the hangers in the plane of such openings.

It has been stated that auxiliary spring seats 26 on one side of the truck may also be connected, for simultaneous operation, to the seats on the opposite side of the truck by bar members 39 secured at their ends to the respective seats, as shown in Figs. 5 and 6. Obviously, and for the same purpose, the auxiliary spring seats 126 supported partially outside the truck frames 100 by hangers 125 and inside thereof by hangers 125a on the inboard type of truck shown in Fig. 7, may also be connected as by the bar 139 indicated in broken lines in this figure. The advantages inherent in either embodiment are available for use in trucks having three pairs of wheels, or more, involving one or more additional bolster assemblies as required.

What is claimed is:—

1. In a car truck having journal boxes and including a truck frame, springs on the boxes supporting the truck frame, a bolster mounted for movement in the truck frame, coil springs hung from the frame intermediate the box springs and bolster at each side of the truck adapted for independent operation upon opposite sides of the bolster and supporting spring beams continuous between coil springs at opposite sides of the truck, elliptic springs between said intermediate springs and the bolster for supporting the bolster, separate bolster hangers pivotally mounted on said spring beams, equalizing bars connecting said hangers, and a spring plank supported upon said bars for connecting said hangers transversely of the truck and supporting said elliptic springs.

2. In a car truck having journal boxes and including a truck frame comprising side frames and connecting transom members spaced apart, springs supporting said frame from the boxes, a bolster supported between said transoms, spring beam assemblies hung from said transoms for independent movement upon opposite sides of the bolster and comprising each spring seats pivotally hung from the respective transoms, springs spaced apart on each of said seats, a continuous spring beam supported on said springs, bolster hangers pivotally supported from opposite ends of said beam, equalizing bars connecting the bolster hangers at adjacent assemblies, a spring plank supported upon said bars for connecting said hangers transversely of the truck, and springs on said plank for supporting the bolster.

3. In a car truck having journal boxes and including a truck frame having transom members spaced apart, springs of given deflection value supporting said frame from the boxes, a bolster mounted for movement between said transoms, spring beam assemblies hung from said transoms for independent movement upon opposite sides of the bolster and each including spring seats, springs of relatively high frequency value spaced apart on said seats, a cap beam supported on said springs, hangers suspended vertically from the transom and pivotally secured to the spring seats at respectively adjacent springs, relatively inclined bolster hangers supported from opposite ends of said cap beam and disposed between associated spring seat hangers, equalizing bars connecting the bolster hangers at adjacent assemblies, a spring plank supported upon said bars for connecting said hangers transversely of the truck, and springs of relatively low frequency value on said plank for supporting the bolster.

4. In a car truck having journal boxes and including a truck frame having transom members spaced apart, springs supporting said frame from the boxes, a bolster mounted for movement between said transoms, companion spring beam assemblies hung from said transoms for independent movement upon opposite sides of the bolster and each including spring seats, springs spaced apart on said seats, a cap beam supported on said springs, parallel hangers suspended vertically from the transom and pivotally secured to the spring seats at respectively adjacent springs, relatively inclined bolster hangers supported from opposite ends of said cap beam and disposed between the beam hangers, equalizing bars connecting the bolster hangers at adjacent assemblies, a spring plank supported upon said bars for connecting said hangers transversely of the truck, springs on said plank for supporting the bolster, and separate means connecting the spring seats of companion assemblies.

5. A car truck including journal boxes, springs on said boxes, a truck frame supported on said springs and having side frames and connecting transoms spaced apart and extending with their respective ends outwardly beyond the side frames, a bolster movably supported between said transoms, companion spring beam assemblies hung at said transoms for independent movement upon opposite sides of the bolster and each including a spring seat, springs on said seat arranged upon opposite sides of adjacent side frames, a cap beam supported on said springs, hangers vertically suspended from the truck frame and pivotally secured to the spring seat at respectively adjacent springs, a relatively inclined bolster hanger supported from said cap beam and disposed between the side frame and one of said seat hangers, equalizing bars connecting the bolster hangers at adjacent assemblies, a spring plank supported upon said bars for connecting said hangers transversely of the truck, and springs on said plank for supporting the bolster.

6. A car truck including journal boxes, springs on said boxes, a truck frame supported on said springs and having side frames and connecting transoms spaced apart and extending with their respective ends outwardly beyond the side frames, a bolster movably supported between said transoms, companion spring beam assemblies hung at said transoms for independent movement upon opposite sides of the bolster and each including a spring seat, relatively high and low frequency springs on said seat outwardly and inwardly of the side frames respectively, a cap beam supported on said springs, hangers suspended vertically from the truck frame and pivotally secured to the spring seat at respectively adjacent springs, a relatively inclined bolster hanger pivotally supported on said cap beam from a bearing disposed between said outer springs and adjacent side frame and in a plane below the points of support on the truck frame for the spring seat hangers, equalizing bars connecting the bolster hangers at adjacent assemblies, a spring plank supported upon said bars for connecting said hangers transversely of the truck, and elliptic springs on said plank for supporting the bolster.

7. A car truck including journal boxes, springs on said boxes, a truck frame supported on said springs and having side frames and connecting transoms spaced apart and extending with their respective ends outwardly beyond the side frames, a bolster movably supported between said transoms, companion spring beam assemblies hung at said transoms for independent movement upon opposite sides of the bolster and each including a spring seat, springs on said seat arranged upon opposite sides of adjacent side frames, a cap beam supported on said springs, hangers suspended vertically from the truck frame and pivotally secured to the spring seat at respectively adjacent springs, a relatively inclined bolster hanger supported from said cap beam and disposed between the side frame and one of said seat hangers, equalizing bars connecting the bolster hangers at adjacent assemblies, a spring plank supported upon said bars for connecting said hangers transversely of the truck, springs on said plank for supporting the bolster, and means connecting the cap beams of spring assemblies on one side of the bolster for simultaneous operation.

8. A car truck including journal boxes, springs on said boxes, a truck frame supported on said springs and having side frames and connecting transoms spaced apart and extending with their respective ends outwardly beyond the side frames for supporting brake riggings, a bolster movably supported between said transoms and riggings, companion spring assemblies hung from said transoms for independent movement upon opposite sides of the bolster and each including a spring seat, springs spaced apart on said seat, a cap beam supported on said springs, hangers suspended vertically from the transom and pivotally secured to the spring seat at respectively adjacent springs, a relatively inclined bolster hanger supported from said cap beam and disposed between the seat hangers, equalizing bars connecting the bolster hangers at adjacent assemblies, a spring plank connecting said bars for holding said bolster hangers inclined, springs on said plank for supporting the bolster, and arcuate bearing surfaces on said equalizing bars and spring plank.

9. In a car truck including journal boxes, springs on said boxes, a truck frame supported on said springs, other cushioning means supported on said frame and engageable with said boxes, a bolster movably mounted in said frame intermediate the last-named cushioning means, spring assemblies hung from said frame for independent movement upon opposite sides of the bolster, separate bolster hangers pivotally mounted on said spring assemblies, equalizing bars connecting said hangers between adjacent assemblies, a spring plank supported upon said bars for connecting said hangers transversely of the truck, springs on said plank for supporting the bolster, and cushioned connections between spring assemblies on respective sides of the bolster.

10. A car truck including journal boxes, springs on said boxes, a truck frame supported on said springs and having side frames and connecting transoms spaced apart and extending with their respective ends outwardly beyond the side frames, a bolster movably supported between said transoms, companion spring beam assemblies hung at said transoms for independent movement upon opposite sides of the bolster and comprising each a spring seat pivotally secured to the respective transoms and side frames, springs on said seat arranged upon opposite sides of adjacent side frames, a cap beam supported on said springs, hangers in parallel suspended vertically from the truck frame and pivotally secured to the spring seat at respectively adjacent springs, a relatively inclined bolster hanger supported from said cap beam and disposed between the side frame and one of said seat hangers, equalizing bars connecting the bolster hangers at adjacent assemblies, a spring plank supported upon said bars for connecting said hangers transversely of the truck, springs on said plank for yieldably supporting the bolster, and means for connecting the spring seats of spring assemblies on one side of the bolster for simultaneous operation.

11. In a car truck having journal boxes and including a truck frame having side frames and connecting transom members spaced apart, springs supporting the frame from said boxes, a bolster supported between said transoms, spring assemblies hung from said transoms for independent movement upon opposite sides of the bolster and each including a spring seat, hangers in parallel suspended vertically from said transoms and secured pivotally thereto and to said spring seat, springs supported on said seat, a transversely extending cap beam supported on said springs, a relatively inclined bolster hanger supported from each end of said cap beam and disposed between adjacent seat hangers, equalizing bars connecting the bolster hangers at adjacent assemblies, a spring plank connecting the equalizing bars for holding the bolster hangers at opposite sides of the truck inclined, and springs on said plank for supporting the bolster.

12. In a car truck having journal boxes, springs on said boxes, a truck frame supported on said springs, a bolster mounted for movement within the frame, spring assemblies hung from said frame for independent movement upon opposite sides of the bolster by hangers in parallel suspended vertically from the truck frame and secured pivotally thereto and to respective spring assemblies, transverse connections between said spring assemblies, a relatively inclined bolster hanger pivotally suspended from each of the spring assemblies, equalizing bars connecting the bolster hangers at adjacent assemblies, a spring plank connecting the equalizing bars for holding the bolster hangers at opposite sides of the truck inclined, and springs on said plank for supporting the bolster.

13. A car truck including journal boxes, springs of a given deflection value on the boxes, a truck frame supported upon said springs, separate springs of relatively high frequency value independently hung from said frame intermediate said first mentioned springs at each side of the truck, a bolster mounted for movement between said last mentioned springs, transverse connections between said last mentioned springs at opposite sides of the bolster, equalizing bars connecting said last mentioned springs, and springs of relatively low frequency value on said equalizing bars supporting said bolster.

14. In a railway car truck comprising a frame supported upon wheels and axles and having a triple spring-suspended bolster comprising coil springs between the frame and axles, elliptic springs supporting said bolster, and coil springs supporting said elliptic bolster springs swingingly suspended from said truck frame and mounted for independent movement at each side of the truck and upon opposite sides of the bolster, independent means at each side of the bolster connecting said swingingly suspended springs for causing simultaneous swinging movement of springs at opposite sides of the truck.

ANDREW CHRISTIANSON.
OTTO JABELMANN.